United States Patent [19]

Weimer et al.

[11] Patent Number: 4,961,508

[45] Date of Patent: Oct. 9, 1990

[54] CONDIMENT DISPENSER WITH PIVOTABLE ARM

[75] Inventors: Ralph Weimer, Wheaton; Louis Porcaro, Orland Park, both of Ill.

[73] Assignee: Restaurant Technology, Inc., Oak Brook, Ill.

[21] Appl. No.: 363,476

[22] Filed: Jun. 12, 1989

[51] Int. Cl.$^5$ ........................ B65D 35/28; B65D 5/42; G01F 11/02

[52] U.S. Cl. .................................... 222/181; 222/183; 222/207; 222/212; 222/214; 222/287

[58] Field of Search ............... 251/7, 9; 222/181, 183, 222/185, 103, 96, 105, 214, 212, 213, 207, 209, 129, 505, 309, 287, 135, 144.5

[56] References Cited

U.S. PATENT DOCUMENTS

| | | | |
|---|---|---|---|
| 2,570,755 | 10/1951 | Booth | 222/96 |
| 2,895,653 | 7/1959 | Giepen . | |
| 3,368,722 | 2/1968 | Wallace | 222/214 |
| 3,741,439 | 6/1973 | Vehrs | 222/103 |
| 3,881,641 | 5/1975 | Pliml, Jr. et al. | 222/214 X |
| 4,394,938 | 7/1983 | Fassanito | 222/214 X |
| 4,448,329 | 5/1984 | Vilaseca et al. | 222/103 X |
| 4,463,876 | 8/1984 | Swallert | 222/214 X |
| 4,513,885 | 4/1985 | Hogan | 222/214 X |
| 4,564,127 | 1/1986 | Garabedian et al. | 222/105 X |
| 4,621,749 | 11/1986 | Kanfer | 222/214 X |
| 4,646,945 | 3/1987 | Steiner et al. | 222/212 X |
| 4,667,854 | 5/1987 | McDermott et al. | 222/214 X |
| 4,715,517 | 12/1987 | Potter et al. | 222/214 X |

FOREIGN PATENT DOCUMENTS

| | | | |
|---|---|---|---|
| 883649 | 10/1971 | Canada . | |
| 885308 | 11/1971 | Canada . | |
| 947720 | 5/1974 | Canada . | |
| 996073 | 8/1976 | Canada . | |
| 1084013 | 8/1980 | Canada . | |
| 1104991 | 7/1981 | Canada . | |
| 1151607 | 8/1983 | Canada . | |
| 1169028 | 6/1984 | Canada . | |
| 0285742 | 10/1988 | European Pat. Off. | 222/212 |
| 362815 | 8/1962 | Switzerland | 222/214 |

*Primary Examiner*—Kevin P. Shaver
*Attorney, Agent, or Firm*—Jenner & Block

[57] ABSTRACT

A condiment dispenser is provided having a length of resilient elastic tubing with an upper tube section and a lower tube section. An arm is pivotally mounted adjacent the tubing and moveable through dispensing and return strokes. The arm has an upper arm portion adjacent the upper tube section and a lower arm portion adjacent the lower tube section. During the dispensing stroke, the upper arm portion moves to compress the upper tube section against a wall on the opposite side of the tubing while the lower arm position retracts from the lower tube section to cause the condiment to be dispensed. The return stroke is caused by the return of the compressed upper tube section to a less compressed section, causing the lower arm section to compress and close the tubing at the lower tube section against the wall.

16 Claims, 5 Drawing Sheets

FIG. 2
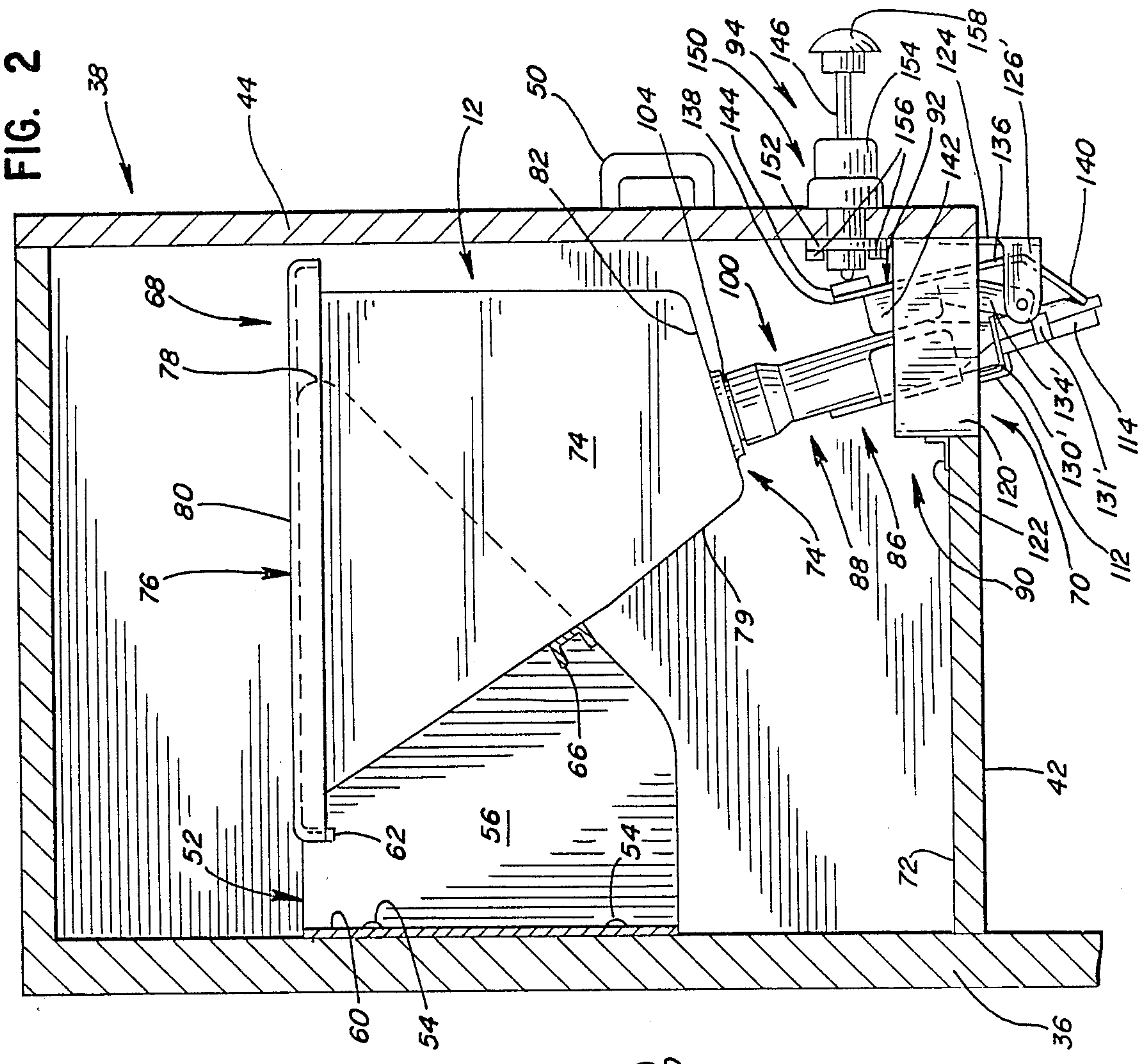
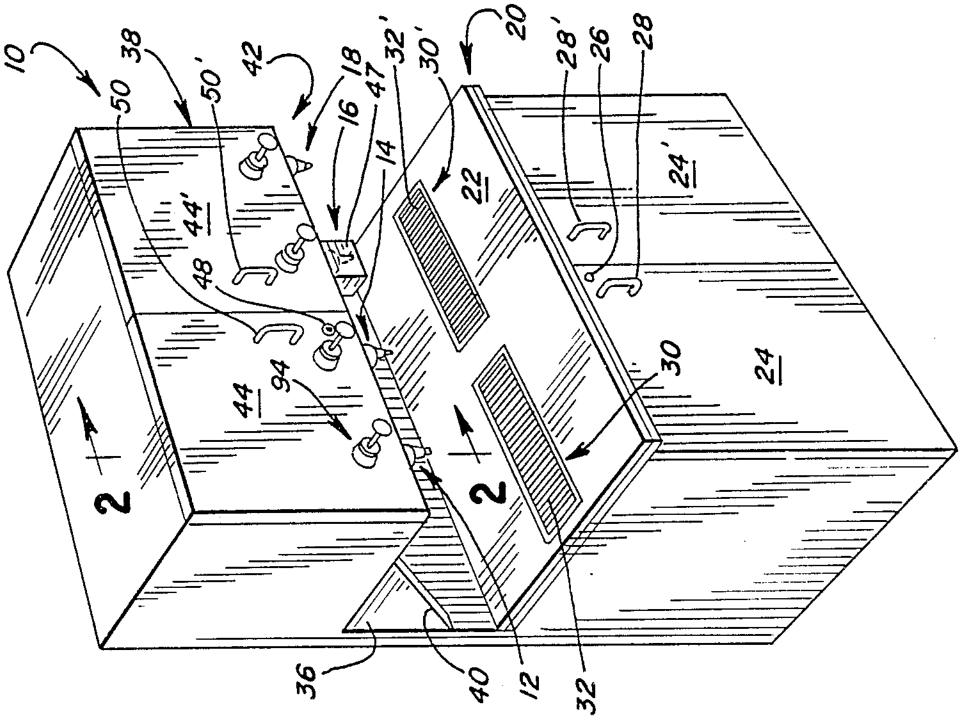
FIG. 1

FIG. 6
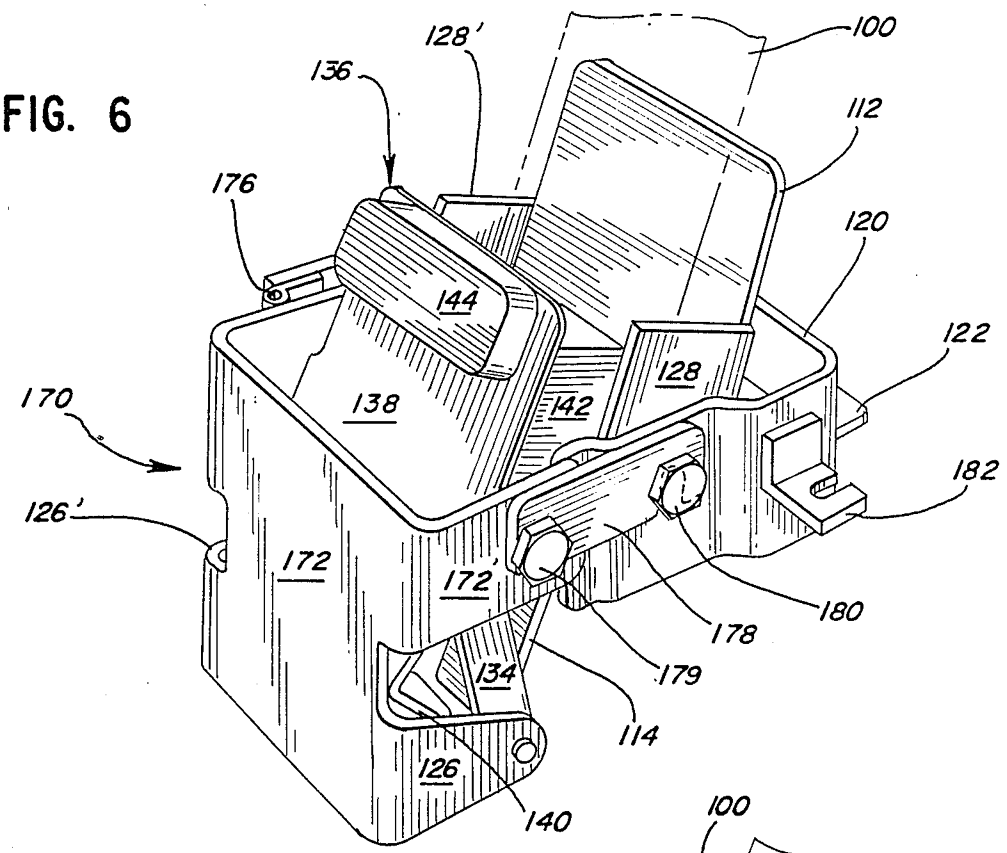
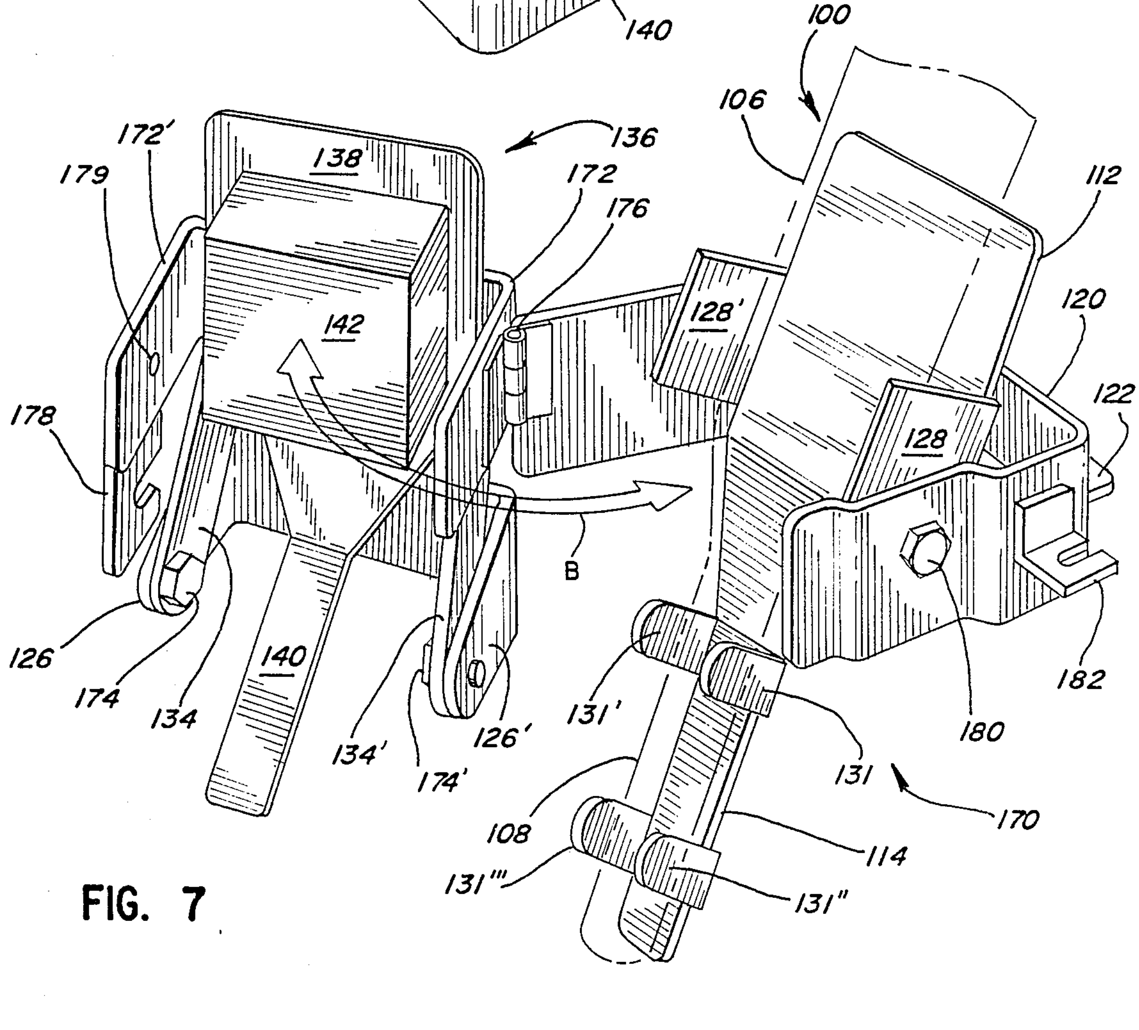
FIG. 7

CONDIMENT DISPENSER WITH PIVOTABLE ARM

FIELD OF THE INVENTION

This invention relates to a viscous fluid dispenser, and more particularly to a condiment dispenser.

BACKGROUND OF THE INVENTION

Numerous applications exist for selectively dispensing a viscous fluid which is being stored in a reservoir.

There are several known types of dispensing devices which utilize both gravity and mechanical force to dispense viscous fluid through a tube connected to a reservoir. One such type, known generically as "roller"-type dispensers, utilize a flexible tube or hose which is connected to a reservoir. The viscous fluid is gravity fed from the reservoir into the tube, and the tube is then squeezed along at least a portion of its length by a roller or slide to dispense the viscous fluid further through and out of the tube. The mechanical force of the roller on the tube is therefore utilized to dispense the viscous fluid out of the tube. In U.S. Pat. No. 3,881,641, for example, a roller is progressively urged into contact with a flexible tube so that the viscous liquid within the tube is squeezed forward towards the dispensing end of the tube at all times rather than partially forward and partially back upstream towards the reservoir.

Another type of viscous liquid dispensing device is illustrated in U.S. Pat. No. 3,741,439, in which a viscous liquid, e.g., toothpaste, is dispensed through the mechanical force of a moveable lever against a length of tubing connected to a reservoir. The moveable lever is mounted adjacent the tubing and opposite a wall on the other side of the tubing. The fulcrum of the moveable lever is initially at the downstream end of the moveable lever so that the moveable lever forms an inclined surface which moves against the tubing. The degree of inclination is selected so that the upstream lever arm initially presses the tubing against the wall before the downstream lever arm presses against the tubing. When the upstream lever arm has pushed inwardly against the tube as far as possible, the downstream lever arm begins to move inwardly. A nub at the end of the upstream lever arm is also used to restrict flow of viscous liquid in the upstream direction. A separate, positive closure mechanism is constructed adjacent the tubing and located above the orifice at the downstream end to prevent air from entering the tubing through the orifice. Another embodiment of U.S. Pat. No. 3,741,439 has a plunger attached to a lever to close a downstream portion of the tubing, but upward flow through a circuitous route is required.

One type of application in which these dispensing devices are useful is in the dispensing of viscous foodstuffs having fluid characteristics. In addition to the dispensing of beverages, such as milk, fruit drinks and the like, the dispensing of condiments such as ketchup, mustard, relish, cheese sauce and the like may be desired. A consumer may purchase a food product without condiments having been placed thereon, while desiring to place one or more different condiments on these food products.

For example, at sports stadiums and other mass-attendance public events, food products like hot dogs and hamburgers may be sold to consumers who then take the purchased food products to one or more condiment dispensing stations. These dispensing stations will apparently be subject to a high degree of use due to the relatively large number of consumers who will use the dispensing station on any given day or number of days. Since the dispensing stations will be subject to a high level of use, these dispensing stations must be durable enough to withstand the high level of use. Further, the dispensing stations should preferably be of simple design so that operation and maintenance of these dispensing stations can be easily and efficiently achieved.

A need exists for a condiment dispenser that is simple in design and operation and which can employ a direct downward path from a condiment holding reservoir and which has a simple and effective closure mechanism that prevents unwanted discharge.

SUMMARY OF THE INVENTION

A dispenser that is especially suitable for dispensing viscous fluids, including condiments such as mustard, ketchup, relish and the like is provided. The dispenser includes a downwardly extending resilient elastic tubing having an upper tube section and a lower tube section. The upper section may be connected to a source of fluid to be dispensed and the fluid is dispensed from the lower section. The inner diameter of the upper tube section may be equal to or greater than the inner diameter of the lower tube section. Wall structure is disposed adjacent the upper and lower tube sections, against which the upper and lower tube sections can be compressed. An arm, in operational relation to the tubing, is pivotally mounted and moveable relative to the tubing through dispensing and return strokes. The arm has an upper arm portion moveable adjacent at least a portion of the upper tube section and a lower arm portion moveable adjacent at least a portion of the lower tube portion. The arm can be mounted for hinged movement permitting the arm to swing away from the wall structure and the tubing, to facilitate removal of the tubing and installation of replacement tubing, which may or may not be connected to a container of a condiment.

The dispensing stroke constitutes movement of the upper arm portion advancing on and compressing a predetermined length or volume of the upper tube section, with the lower arm portion simultaneously retracting from the lower tube section, to cause the condiment to be dispensed from the lower tube section. The return stroke is opposite of the dispensing stroke and is caused by the return of the compressed upper tube section to a less compressed position and causing the lower arm section to compress and close the tubing at the lower tube section.

More particularly, in the dispensing stroke, the arm pivots by application of an external force and the upper arm portion moves against a predetermined length of the upper tube section to compress the upper tube section against the wall, while the lower arm portion retracts from the lower tube section to cause the flow of fluid from the upper tube section to and through the lower tube section. The return stroke is caused by the return of the compressed upper tube section to a less compressed position. The arm is therefore pivoted through the return stroke in a direction opposite the direction of the dispensing stroke, and the lower arm portion moves to compress and close the lower tube section at the end of the return stroke by compressing the lower tube section between the lower arm portion and the wall. Structure may be provided that permits adjustment of the dispensing stroke length which adjusts the amount of fluid flow per stroke.

In accordance with one embodiment of the present invention, the ratio of the inner diameter of the upper tube section to the inner diameter of the lower tube section is at least about 1.5 to 1. For example, the upper tube section may have a diameter of about 1.5 inches and the lower tube section may have a diameter of about 0.75 inches or less.

A shoe may be mounted to the upper arm portion and disposed between the tubing and the arm for compressing the upper tube section during the dispensing stroke along the predetermined length. The shoe desirably has a substantially flat surface for compressing the predetermined length of the upper tube section substantially simultaneously. A force transmitting member may also be provided to transmit a dispensing stroke force to the upper arm portion from a user's hand, for example. The force transmitting means is also resiliently biased away from the upper arm portion.

A check valve may also be incorporated within the tubing to prevent backflow (flow in an upward direction) of the viscous fluid during the dispensing stroke. In one embodiment, the check valve is a flap hinged to a side of the tubing and moveable between a first, open position and a second, closed position. The tubing may also be inclined at an angle of about 17 degrees from vertical.

The apparatus can be conveniently contained within a cabinet, with a portion of the downstream section mounted to extend out of the cabinet and inclined at a slight angle (such as about 17 degrees, for example) from vertical so that the bottom of the dispensing tube extends forward of the cabinet front to provide improved access to the user during dispensing. A reservoir for containing viscous fluid can be mounted in the cabinet and connected to the upstream section of the tubing.

In accordance with another embodiment of the invention, a method of dispensing a viscous fluid utilizing a fluid dispenser in accordance with the invention is provided.

Other embodiments and advantages of the invention will become apparent upon reading of the following detailed description with reference to the drawings. Throughout the drawings, like reference numerals refer to like parts.

BRIEF DESCRIPTION OF THE DRAWINGS

FIG. 1 is a perspective view of a condiment dispenser cabinet having four dispensing stations;

FIG. 2 is an elevated sectional side view of one of the dispensing stations, along the line 2—2 in FIG. 1;

FIG. 6 is a perspective view of an alternate embodiment of a dispenser in accordance with the present invention in position for dispensing; and FIG. 7 is a perspective view of the dispenser of FIG. 6 shown in an open position which facilitates reloading of the dispenser.

DETAILED DESCRIPTION OF THE INVENTION

While the invention is useful in dispensing many types of viscous fluids, the invention is especially useful in dispensing condiments which are commonly served in quick service restaurants and hot dog stands, for example. These condiments include ketchup, mustard, relish, cheese sauce, mayonnaise, tartar sauce and the like which a consumer typically places on food products. However, the invention is not only useful for the dispensing of condiments, but is also useful to the dispensing of fluids in general. For purposes of this discussion, "fluid" is defined as any material or substance that changes shape or direction uniformly in response to an external force imposed on it and applies not only to liquids, but also to finely divided solids and solids generally suspended in a carrier. For illustrative purposes, the dispensing of condiments will be discussed.

Figure 3:
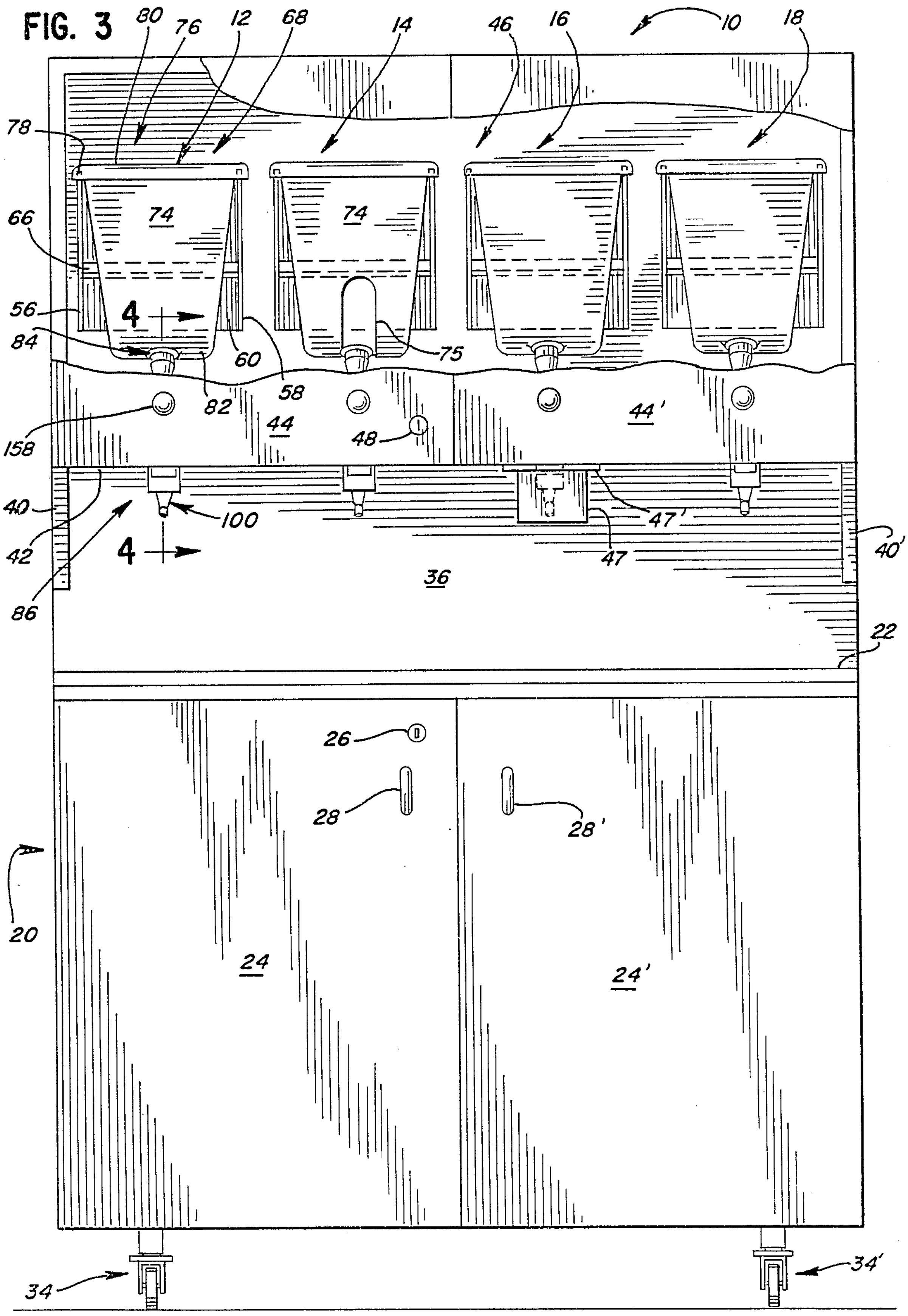
FIG. 3 is a sectional front view of the condiment dispenser cabinet in FIG. 1.

Referring to the Figures generally and in particular to FIGS. 1–3, there is illustrated a cabinet 10 having four dispensing stations 12, 14, 16 and 18. Each dispensing station is used to dispense a condiment that is the same or different than a condiment dispensed by one or more of the other dispensing stations. Cabinet 10 can be made of any suitable material, such as metal or wood. Any suitable structure can be used to contain the dispensing stations, as desired.

Cabinet 10 has a lower counter section 20 including a counter 22 for facilitating the placement of condiments on food products, such as hot dogs, for example. However, it is to be understood that condiments can be dispensed onto all sorts of food products. Hinged lower doors 24 and 24' provide access to a storage area (not shown) within lower counter section 20. Lower doors 24 and 24' can be locked to prohibit access to the storage area with lock 26. Lower doors 24 and 24' are opened by pulling handles 28 and 28', respectively. Counter 22 has formed therein two drip tray assemblies 30 and 30', including grates 32 and 32', respectively. Drip tray assemblies 30 and 30' are positioned below the dispensing stations to catch any excess or misdirected condiment. Grates 32 and 32' are removable to facilitate cleaning of the drip tray assemblies 30 and 30'. Cabinet 10 is also supported by a plurality of roller assemblies 34 and 34' on the bottom of lower counter section 20 so that cabinet 10 can be readily moved from on location to another.

Rear wall 36 of counter section 20 also supports upper counter section 38. Upper counter section 38 is further supported from rear wall 36 by at least two trusses 40 and 40, which are connected at one end to rear wall 36 and at the other end to bottom 42 of upper counter section 38. Upper doors 44 and 44' provide access to a dispensing station mounting area 46 within upper counter section 38. Upper doors 44 and 44' can be locked to prohibit access to mounting area 46 with lock 48. Upper doors 44 and 44' are opened by pulling handles 50 and 50', respectively. As illustrated in FIG. 3, the four dispensing stations 12, 14, 16 and 18 are positioned in substantially linear relationship in relation to one another transversely within mounting area 46.

A removable cover 47 can be provided to cover the exposed end of each dispensing station. As illustrated in FIGS. 1 and 3, cover 47 encloses the end of dispensing station 16. Typically, cover 47 will be put in place as illustrated in FIGS. 1 and 3 when dispensing station 16 will not be used for an extended period of time, such as after the closing of a restaurant or hot dog stand, for example. Cover 47 attaches to bottom 42 of upper counter section 38 by a flexible magnetic gasket 47' located around the top periphery of cover 47. A ferromagnetic surface corresponding to gasket 47' is provided (not shown) on bottom 42 to permit attachment of cover 47 in the desired location. Of course, any suitable structure to attach cover 47 to bottom 42 can be utilized.

As illustrated in FIGS. 2–5, the structure of dispensing stations 12, 14, 16 and 18 will now be described. Since each dispensing station is similarly constructed, the structure of dispensing station 12, illustrated in FIGS. 2, 4 and 5 will be particularly described. However, it is to be understood that the structure of dispensing stations 12, 14, 16 and 18 are identical so that a detailed description of stations 14, 16 and 18 is not needed.

With respect to dispensing station 12, a dispenser support 52 is mounted directly to rear wall 36 with screws 54. Dispenser support 52 has left and right side walls 56 and 58, respectively, secured substantially perpendicular to a rear support wall 60 of dispenser support 52. Left and right side walls 56 and 58 each has a notch 62 and 64, respectively, formed therein along the top edge to receive a portion of reservoir assembly 68 as hereinafter described. Further, a reservoir support bar 66 extends between left and right side walls 56 and 58 and is positioned to support a reservoir assembly 68. A portal 70 is formed in the floor 72 of upper counter section 38 to allow access to dispensing station 12 as shown in FIG. 2.

Reservoir assembly 68 includes an open top reservoir 74 which contains a type of condiment C within a flexible condiment bag 82. Reservoir 74 is secured to support bar 66. Reservoir 74 includes a downwardly extending lip 76 which extends around the periphery of reservoir 74 and terminates at lip edge 78. Further, the rear edge height of lip 76 is sufficient to rest in notch 62 and side walls 56 and 58 support reservoir 74 along lip 76. Through this arrangement, reservoir assembly 68 is supported by dispenser support 52. Further, support bar 66 is used to support the rear wall 79 of reservoir 74 to provide additional stability. Since rear wall 79 is inclined to direct the flow of condiment C contained therein generally downward, support bar 66 is also inclined to a corresponding degree so that rear wall 79 rests flat against support bar 66.

After the existing quantity of condiment C has been dispensed from reservoir 74, or when it is desired to refill or replace reservoir 74, condiment bag 82 contained within reservoir 74 ca simply be lifted out of reservoir 74 and replaced.

Figure 4:
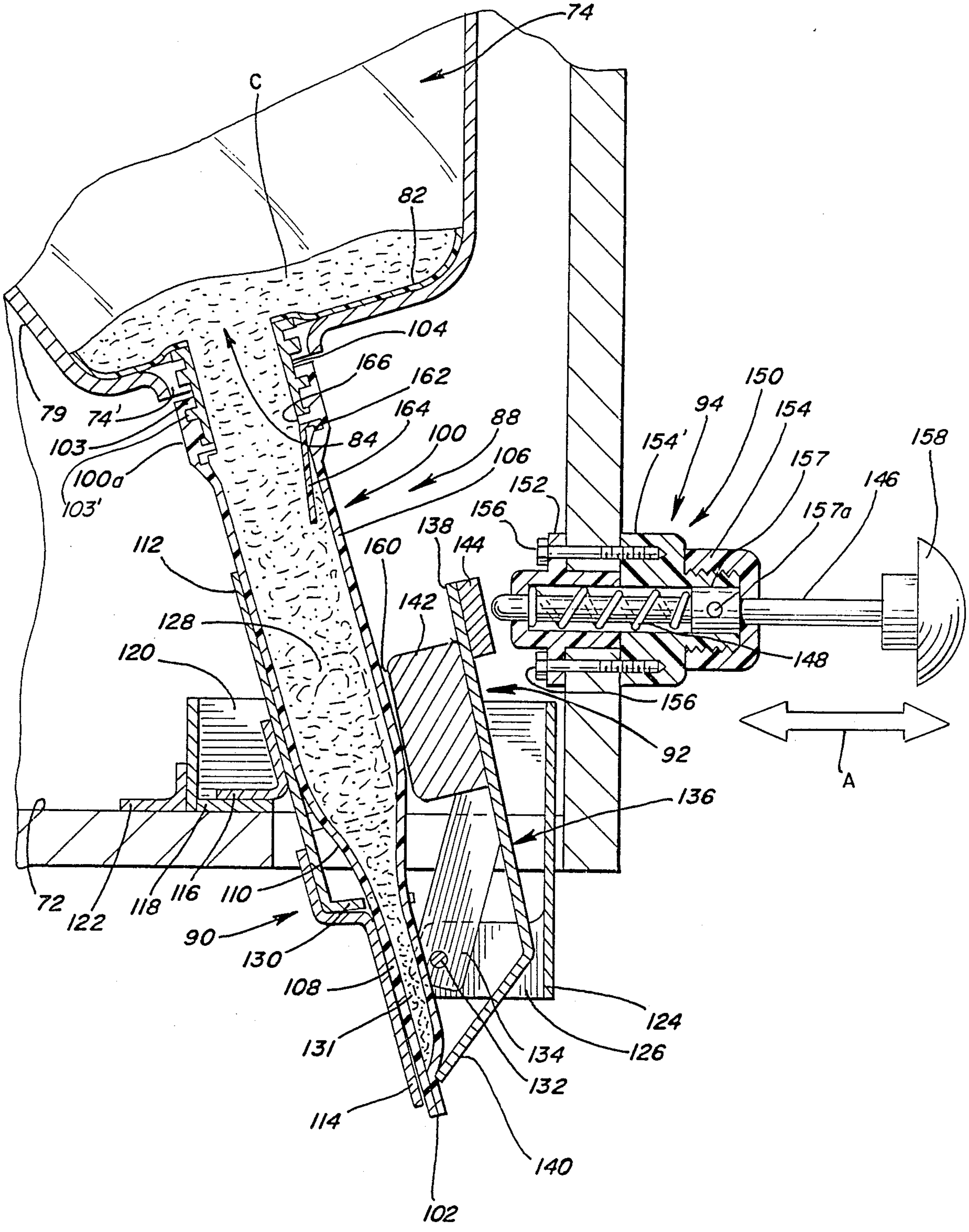
FIG. 4 is a partial sectional side view of the dispensing station in FIG. 2, illustrating the end of the return position.
Figure 5:
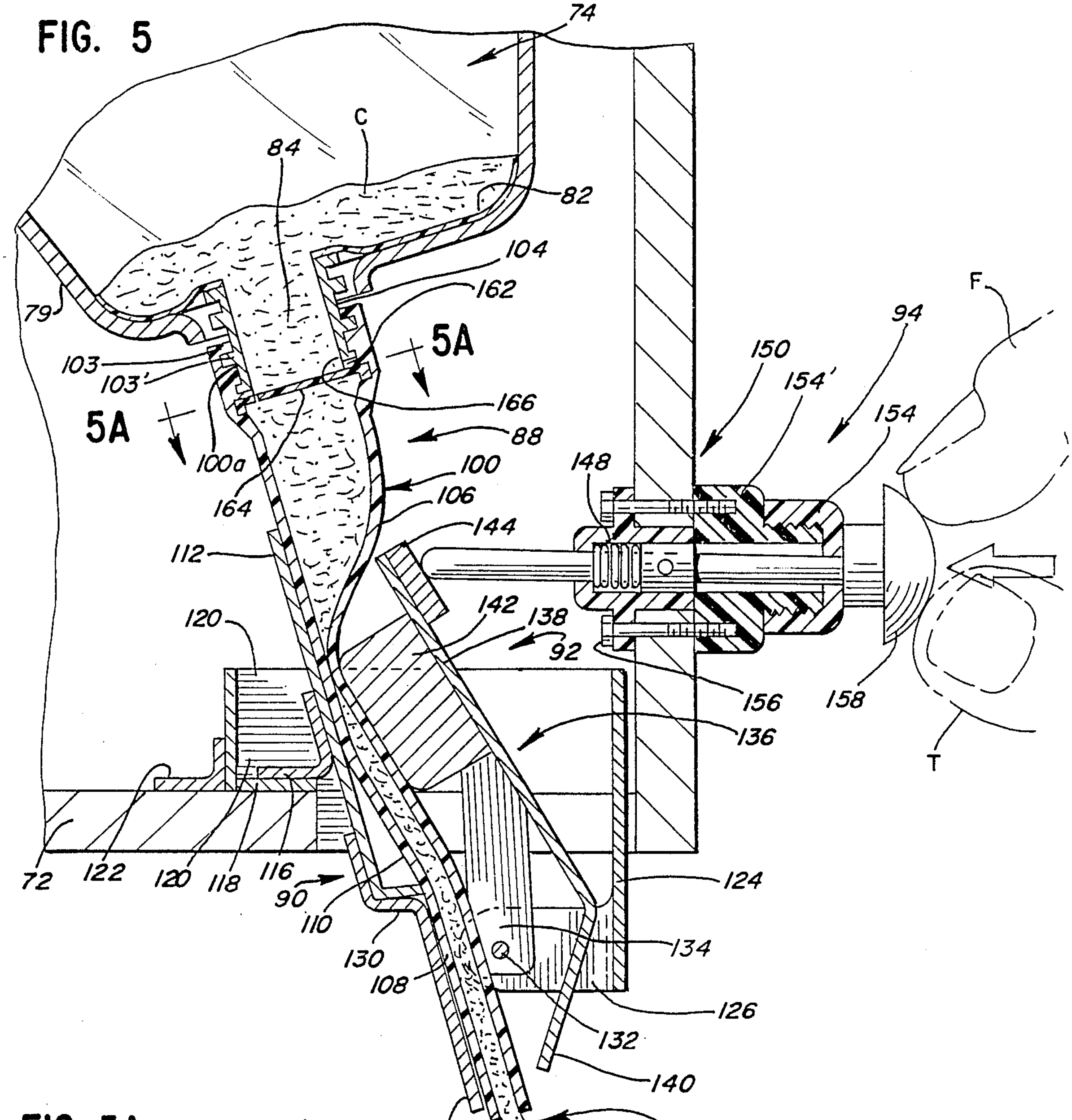
FIG. 5 is a partial sectional side view of the dispensing station in FIG. 4, illustrating the end of the dispensing stroke.
Figure 5:
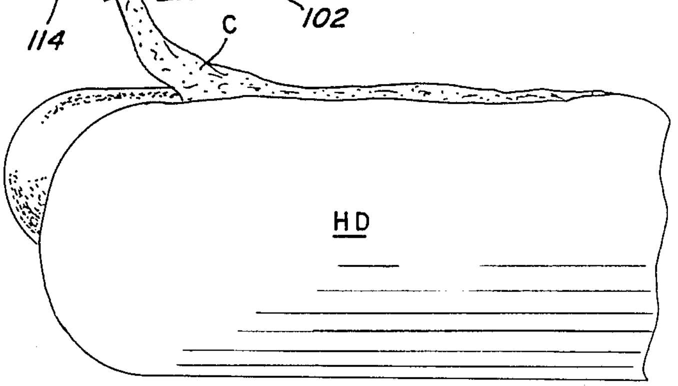

As illustrated in FIGS. 2, 4 and 5, condiment bag 82 in reservoir 74 has an opening 84 through which condiment C flows into a dispenser assembly, shown generally as dispenser assembly 86. Bottom surface of reservoir 74 is also inclined to direct the flow of condiment C generally towards opening 84. Reservoir 74 has a corresponding opening 74, and may also include a vertical slot 75 to facilitate loading and unloading of bag 82 with tubing 100 (reservoir 74 of dispensing station 14 in FIG. 3).

Dispenser assembly 86 of dispensing station 12 is shown in greater detail in FIGS. 4 and 5. Dispenser assembly 86 includes several separate but interacting subassemblies. Specifically, dispenser assembly 86 includes a tubing assembly 88, a wall assembly 90, an arm assembly 92 and an external force transfer assembly 94. These subassemblies 88, 90, 92 and 94 interact to selectively dispense relatively predetermined amounts of condiment. A normal standby or non-dispensing position is illustrated in FIG. 4. The end of the dispensing stroke is illustrated in FIG. 5. In FIG. 5, as is apparent, a quantity of condiment C is being dispensed on a hot dog HD through application of external force by a thumb T and a finger F of a user. Condiment C is dispensed as desired along the length of hot dog HD by passing the hot dog HD under dispenser assembly 86 as condiment C is being dispensed.

Each of subassemblies 88, 90, 92 and 94 and their operation will now be described.

Tubing assembly 88 includes a length of resilient elastic tubing 100. Tubing 100 extends generally vertically downward in a straight run from bag 82 and reservoir 74 and is angled towards the front of cabinet 10 to provide access to the opening 102 at the lower end of tubing 100. Condiment C flows out of bag 82 and reservoir 7 by gravity into tubing 100, and then through and out opening 102 at the lower end of tubing 100. Tubing 100 is attached to opening 84 through which condiment C flows by gravity into tubing 100. Opening 84 in bag 82 has mounted therein a spout 104 to which tubing 100 is connected by any suitable method, such as with complementary threads or in this case by means of a snap-lock arrangement, with the upper end 100*a* of tubing 100 and spout 104 each having a plurality of complementary and interlocking circumferential ribs 103 and 103, respectively.

The inside diameter of tubing 100 can be of any sufficient dimension. For example, the inside diameter of tubing 100 can be of substantially constant dimension throughout. Preferably, as illustrated in FIGS. 4 and 5, the inner diameter of tubing 100 between its upper and lower ends is not constant. Tubing 100 has an upper tube section 106 and a lower tube section 108. Most preferably, the ratio of the inner diameter of the upper tube section 106 to the inner diameter of the lower tube section 108 is at least about 1.5 to 1. For example, a portion of the upper tube section 106 can have a diameter of about 1.5 inches while lower tube section 108 can have a diameter of about 0.75 inches or less. The inner diameter of lower tube section 108 preferably also varies depending on the condiment to be dispensed. With condiments such as ketchup or mustard, a lower tube inner diameter of about 5/16 inches has been determined preferable, and for standard hot dog relish, a lower tube inner diameter of about ⅜ inches has been determined to be preferable. Upper tube section 106 and lower tube section 108 are joined generally by a funnel tube section 110 which has a varying diameter which varies as it extends downward.

The use of an upper tube section 106 and a lower tube section 108 achieves an advantage of increased fluid displacement through tubing 100. Specifically, a relatively large amount of condiment C is capable of being dispensed out of end or opening 102 of lower tube section 108. For example, if the ratio of the inner diameter of the upper tube section 106 to the inner diameter of the lower tube section 108 is 2.0 to 1, it is possible for four times the amount of condiment C to be dispensed during a single dispensing stroke through lower tube section 108 as compared to the situation if the same ratio was instead 1 to 1, i.e. where the inner diameter of tubing 100 is constant throughout. Accordingly, each increase in the inner diameter of the upper tube section

106 provides for an increase in the amount of condiment C dispensed through lower tube section 108 about equal to the increase of the inner radius squared, if the inner diameter of lower tube section 108 remains constant. At the same time, as discussed below, the relatively small diameter of lower tube section 108 allows lower tube section 108 to be pinched closed to restrict condiment flow therethrough, as illustrated in FIG. 4. Moreover, larger diameter upper section 106 can provide a greater force to operate the dispensing mechanism during the return stroke as hereinafter described.

Tubing 100 is made of any suitable material, such as suitable rubber or plastic and is preferably food quality molded plastic, such as Tygon®. Upper tube section 106 and lower tube section 108 preferably have a thickness sufficient to exhibit resilient elastic characteristics. Preferably, tubing 100 has a high modulus of resilience. Most preferably, tubing 100 is constructed so that upper tube section 106 has a high modulus of resilience while lower tube section 108 does not. However, since the inner diameter of upper tube section 106 and lower tube section 108 also affects their respective resilient elastic characteristics, the inner diameters must also be taken into account in choosing the tubing 100 having the desired resilience. Tubing 100 can be produced in a desired configuration by molding the tube material, for example.

Wall assembly 90 is positioned adjacent at least a portion of upper and lower tube sections 106 and 108 and preferably adjacent those portions of tubing 100 that are compressed during operation of dispensing station 12. Specifically, in the illustrated embodiment, upper flat wall portion 112 is adjacent at least a portion of upper tube section 106 and lower flat wall portion 114 is adjacent lower tube section 108. Upper wall portion 112 and lower wall portion 114 are inclined and angled towards the front of cabinet 10 to correspond to the angle of inclination of tubing 100. Through this arrangement, tubing 100 rests substantially flat along at least a portion of its length and circumference against wall assembly 90.

As illustrated in FIGS. 4 and 5, upper wall portion 112 and lower wall portion 114 do not support tubing 100 along its entire length. However, these wall sections do support the two predetermined lengths of tubing 100 which are compressed at one time or another during operation of the dispensing station 12, as discussed below. In FIG. 4, a predetermined length of lower tube section 108 is being compressed against lower wall portion 114, and in FIG. 5, a length of upper tube section 106 is being compressed against upper wall portion 112.

Lower wall portion 114 is attached to upper wall portion 112 by any one of several conventional manners, such as by welding, brazing or by mechanical fasteners. Upper wall portion 112 is similarly secured to angle member 116, and angle member 116 is directly secured to floor 72 of upper counter section 38 by inner floor plate 118. Inner floor plate 118 is also secured to frame 120, which is also secured to and supported in an generally upright posture by outer floor plate 122, which is also generally perpendicular to floor 72. Frame 120 is of generally rectangular construction through which a portion of the lower tube section 108 of tubing 100 extends. Front side 124 of frame 120 is longer than the other sides of frame 120 and extends downward through portal 70 to permit mounting thereto of a portion of dispensing station 12. At the lower end of front side 124, arm mount extensions 126 and 126' (FIG. 2) are formed extending towards the rear of cabinet 10, generally perpendicular to front side 124. Arm mount extensions 126 and 126, are pivotally mounted to arm assembly 92.

Upper wall portion 112 also has generally perpendicular extending flanges 128 and 128' (FIGS. 2 and 4) which extend on either side of tubing 100 to keep tubing 100 in place. A pair of middle flanges 130 (FIGS. 4 and 5) and 130, (FIG. 2) likewise extend from the lower end of upper wall portion 112 on either side of tubing 100. Further, lower flanges 131 (FIG. 4) and 131' (FIG. 2) likewise extend from lower wall portion 114 on either side of tubing 100. Another pair or flanges (not shown) may be provided on lower wall portion 114 below flanges 131 and 131' to provide a further guide for tubing 100.

Arm assembly 92 includes a rigid arm member 136 and is positioned adjacent tubing 100 on the opposite side of tubing 100 from upper wall portion 112 and lower wall portion 114. As illustrated in FIGS. 4 and 5, arm assembly 92 is mounted for pivotal movement about an axis defined by pivot rod 132 which extends between and through arm mount extensions 126 and 126'. Arm assembly 92 is mounted for pivotal movement about this axis through dispensing and return strokes. The end of the dispensing stroke is illustrated in FIG. 5, and the end of the return stroke is illustrated in FIG. 4.

A suitable separate pivot member 132, such as a threaded fastener or rod, about which arm 136 pivots, is mounted to struts 134 (FIGS. 4 and 5) and 134' (FIG. 2). Arm 136 is directly mounted to each of struts 134 and 134' in any suitable manner, such as by welding or brazing. Arm 136 can be made of any suitable rigid material, such as metal or hardened plastic. Rigid arm 136 has an upper arm portion 138 and a lower arm portion 140. Upper arm portion 138 is formed generally at an angle to lower arm portion 140, preferably at about forty-five degrees. Upper arm portion 138 is used to compress the upper tube section 106.

Arm 136 pivots about pivot members 132 and as illustrated in FIG. 5, the pivot point is closer to the tube contact portion of lower arm portion 140 than the tube contact portion of upper arm portion 138, so that a mechanical advantage is provided for the force exerted by upper tube section 106 of tubing 100 as it expands during a return stroke to urge lower arm portion 140 against lower tube section 108 to pinch it closed. As illustrated in FIGS. 4 and 5, the ratio of the distance from pivot member 132 to the central area of the tube contact portion of upper arm portion 138 to the distance from pivot member 132 to the tube contact portion of lower arm portion 140 is about 2:1.

A shoe 142 may be attached to upper arm portion 138 adjacent to tubing 100 to assist in compressing upper tube section 106. Shoe 142 is of sufficient dimensions to achieve the desired compression of tubing 100. For example, shoe 142 can have a thickness of about $\frac{3}{8}$ inches and a length of about 2-1/16 inches. The length of shoe 142 should be sufficient to compress the desired length of tubing 100, as illustrated in FIG. 5. Through the design of upper arm portion 138 and shoe 142, a predetermined length of upper tube section 106 is compressed during the dispensing stroke, as illustrated in FIG. 5. A contact pad 144 is mounted on arm 136 opposite the side where shoe 142 is mounted.

External force transfer assembly 94 serves to transmit mechanical force to arm assembly 92 through contact pad 144. External force transfer assembly 94 has a rod 146 which is moveable through the dispensing and return strokes in the horizontal direction depicted generally by arrow A in FIG. 4. Rod 146 is shown at the end of the dispensing stroke in FIG. 5, having been manually moved to that position, and at the end of the return stroke in FIG. 4. Rod 146 is spring biased by spring 148 within housing 150 causing rod 146 to return after a dispensing stroke upon release by a user. Housing 150 has an inner portion 152 and outer portions 154 and 154' which are threaded together. Portion 154' is fastened to portion 152 by screws 156.

A selectively mountable collar 157 is optional and is secured to rod 146 and permits adjustment of the length of the dispensing stroke. Collar 157 is secured to rod 146 by a set screw **157*a*. By adjusting the position of collar 157 on rod 146, the length of the dispensing stroke is also adjusted. As collar 157 is mounted closer to end of rod 146 that is adjacent contact pad 144, the dispensing stroke is shortened and upper tube section 106 is thereby compressed to a lesser degree during a dispensing stroke, resulting in less condiment being dispensed per dispensing stroke. Conversely, as collar 157 is mounted further away from the end of rod 146 that is adjacent contact pad 144, the dispensing stroke is lengthened and upper tube section 106 is thereby compressed to a greater degree during a dispensing stroke, resulting in more condiment being dispensed per dispensing stroke. As illustrated in FIGS. 4 and 5, collar 157** is located for a maximum length dispensing stroke.

A knob 158 mounted to the outer end of rod 146 facilitates application of pressure to and manual movement of rod 146 through the dispensing stroke. However, it is to be understood that any suitable mechanism useful in transmitting a dispensing stroke force to upper arm member 138 can be used.

As will be appreciated, collar 157 could be mounted on rod 146 adjacent knob 158 as desired to achieve the desired length dispensing stroke.

The operation of dispensing station 12 will now be described. To dispense condiment C onto hot dog HD, knob 158 is grasped or pushed inward towards cabinet 10. Rod 146 accordingly moves in a horizontal direction generally towards cabinet 10, contacting contact pad 144. Shoe 142 then moves against the predetermined length of upper tube section 106 approximately equal to the length of shoe 142. Shoe 142 has a substantially flat surface 160 for compressing the predetermined length of upper tube section 106 substantially simultaneously at all points adjacent shoe 142. Also simultaneously, lower arm member 140 retracts from contact with lower tube section 108 to permit a relatively predetermined quantity of condiment C to flow from upper tube section 106 to lower tube section 108, and out through opening 102 as upper tube section 106 is compressed.

After the various components have reached their respective positions at the end of the dispensing stroke, these positions being illustrated in FIG. 5, knob 158 is released and rod 146 is returned to its original position by spring 148.

Tubing 100, when compressed, has an amount of potential energy stored therein. The potential energy, which is stored in the deformed (compressed) elastic tubing 100 due to its relatively high modulus of resilience, forces the arm assembly 92 through a pivoting movement opposite its movement through the dispensing stroke. The return stroke is therefore caused by the return of the compressed upper tube section 106 to a less compressed position, thereby moving the arm assembly 92 through the return stroke until the arm assembly realizes its position at the end of the return stroke. This position is illustrated in FIG. 4. As arm assembly 92 move through its return stroke, lower arm member 140 is moved against lower tube section 108 to compress lower tube section 108 against lower wall portion 114. Lower tube section 108 is therefore pinched closed to restrict the further flow of condiment C out of lower tube section 108. The movement of upper tube section 106 from its compressed, dispensing position to its uncompressed, return position generates a vacuum within tubing 100 which causes additional condiment to be drawn from reservoir 74 into tubing 100.

The quantity of condiment C which is dispensed by one stroke can be predetermined by choosing an appropriate inner diameter of upper tube section 106 and lower tube section 108 and by appropriately selecting the total length of tubing 100 that is compressed during a full dispensing stroke. The actual quantity of condiment dispensed depends on how much upper tube section 106 is compressed. If tubing 100 is compressed as much as possible, generally illustrated in FIG. 5, a maximum amount of condiment will be dispensed. If tubing 100 is compressed approximately one-half as much as illustrated in FIG. 5, approximately one-half as much condiment as the maximum amount will be dispensed. Accordingly, the percentage of the maximum amount of condiment C which is dispensable will generally correspond to the achieved percentage of the maximum compression shown in FIG. 5. In this way, a consumer can dispense individually desirable amounts of condiment C in an amount intermediate the maximum achieved amount and zero.

Figure 5A:
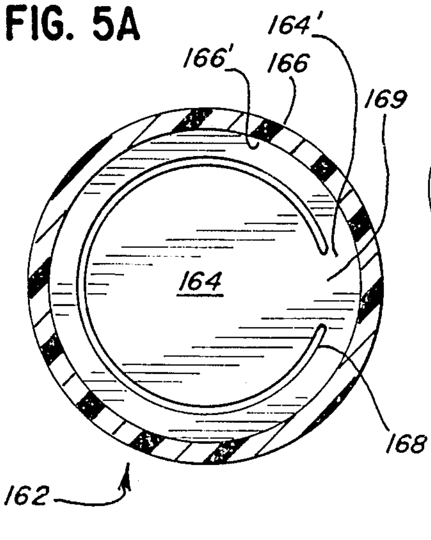
FIG. 5A is a plan view of the check valve assembly taken along lines 5A—5A of FIG. 5.

A potential problem is excessive backflow of condiment C in tubing 100 upstream during the dispensing stroke, when upper tube section 106 is being compressed. Although a minor amount of backflow is tolerable, too much backflow will prevent the desired amount of condiment C from being dispensed since a large portion of condiment C to be dispensed will be moving upstream instead. To restrict backflow during the dispensing stroke, a check valve 162 can also be placed within tubing 100 within, or at a point above upper tube section 106. Any suitable check valve that performs the intended function can be utilized. Preferably, a check valve design as illustrated in FIGS. 4, 5 and 5A is used. Specifically, check valve assembly 162 comprises a moveable flap 164 hinged to the inner surface 166, of check valve support ring 166. Flap 164 is moveable between a first, open position shown in FIG. 4 and a second, closed position shown in FIG. 5. Check valve assembly 162 may be integrally formed from plastic or other suitable material in which a relatively thin plastic sheet 164' is formed across check valve support ring 166. A slit 168 is cut or formed in sheet 164' to define flap 164, which may be a curved slit as illustrated in FIG. 5A, the uncut portion 69 of plastic sheet 164' acting as a hinge. Check valve support ring 166 will generally be thicker than sheet 164' to provide structural support and to facilitate mounting of check valve assembly 162 in tubing 100. Preferably, the outer diameter of check valve support ring 166 will be slightly larger than the inner diameter of tubing 100 in the location where check valve assembly 162 is mounted, to facilitate mounting therein in a force-fit relationship.

As arm assembly 92 moves through the dispensing stroke to compress tubing 100, a portion of condiment C within tubing 100 is forced upward towards reservoir 74. If enough of condiment C was forced upward and back into reservoir 74, flow of condiment C through tubing 100 would be hampered in later dispensing strokes. However, with check valve assembly 162, condiment C that is directed upstream carries flap 164 with it. Flap 164 moves, at least for a portion of the dispensing stroke, from its first, open position to its second, closed position. Once flap 164 is in its second position, further upstream flow of condiment C is restricted. During the return stroke, flap 164 is then moved to its first position, being carried by the downward movement of condiment C within the tubing 100, as discussed above. Spout 104 prevents flap 164 from opening in a direction towards reservoir 74.

Referring to FIGS. 6 and 7, an alternate embodiment of a dispenser assembly is illustrated. The depicted apparatus, dispenser assembly 170, is similar in construction to dispenser assembly 86 previously described with respect to FIGS. 2, 4 and 5, and like reference numerals for dispenser assembly 170 refer to like parts throughout the FIGURES. External force transfer assembly 94 is not illustrated in FIGS. 6 and 7 and elastic tubing 100 is shown in phantom lines.

To frame 120 is attached arm support frame 172, on which arm 136 is pivotally mounted to arm mount extensions 126 and 126' of frame 172 by means of suitable screws 174. Arm support frame 172 is secured to frame 120 by a hinge 176 and a latch 178 located on frame 172 opposite hinge 176 and secured to side 172' of frame 172 by a screw 179.

In the dispensing position, shown in FIG. 6, arm support frame 172 is closed so that latch 178 is secured to a latch post 180 on frame 120 and arm 136 is in position to selectively compress tubing 100 as previously described with respect to dispenser assembly 86.

In the reloading position, shown in FIG. 7, latch 178 has been released and arm support frame assembly has been moved to the open position as illustrated by arrow B by rotation away from frame 120 about hinge 176. In this position, arm 136 is positioned away from tubing 100 thereby facilitating access to and removal of tubing 100 and reservoir 74 (not shown) from the dispenser. After tubing 100 is removed and replaced, arm support frame 172 is shut to the closed position as illustrated in FIG. 6 and latch 178 is secured to latch post 180.

Thus, in accordance with the embodiment illustrated in FIGS. 6 and 7, arm 136, arm frame 172 and associated structure can be rotated by hinge 176 away from frame 120, wall assembly 90 and tubing 100.

Upper flanges 128 and 128' can serve to act as stops for arm 136 by preventing further movement of upper arm member 138 toward upper flat wall portion 112. In this manner, the degree to which upper tube section 106 can be compressed can be limited, thereby preventing too great a compression force from being applied to upper tube section 106, which can extend the life of tubing 100.

A pair of slotted L-shaped mounting brackets 182 (only one is illustrated in FIGS. 6 and 7) are secured to the sides of frame 120 to facilitate mounting dispenser assembly 170 at a desired location. Suitable wing nuts or other fasteners can be utilized to allow removal of assembly 170 for cleaning, for example, by hand without the need for using hand tools.

Lower flanges 131 and 131' and upper flanges 128 and 128' also act as guides for tubing 100, as illustrated in FIG. 7. Additional lower flanges 131'' and 131''' are also provided below flanges 131 and 131' to provide a further guide for tubing 100.

While the invention has been described in connection with several preferred embodiments, it will be understood that the discussion above was not intended to limit the invention to these embodiments. On the contrary, it is intended to cover all alternatives, modifications and equivalents as may be included in the spirit and scope of the invention as defined by the appended claims.

What is claimed is:

1. A viscous fluid dispensing apparatus comprising:

(a) a length of resilient elastic tubing extending generally downwardly and having an upper tube section and a lower tube section;

(b) wall means for providing a wall adjacent said upper and lower tube sections; and (c) an arm adjacent said tubing and positioned on the opposite side of said tubing from said wall means and mounted for pivotal movement about an axis moveable through dispensing and return strokes, said arm comprising an upper arm portion above the pivot axis and adjacent at least a portion of said upper tube section and a lower arm portion extending below said pivot axis and adjacent at least a portion of said lower tube section, said dispensing stroke comprising movement of said upper arm portion against a predetermined length of said upper tube section to compress said upper tube section against said lower tube section to cause a flow of fluid from said upper tube section to said lower tube section, said return stroke caused by return of said compressed upper tube section to a less compressed position thereby moving said arm through said return stroke comprising pivoting movement of said arm in a direction opposite of said dispensing stroke and causing said lower arm portion to compress and close said tubing at the lower tube section at the end of said return stroke by compression of said lower tube section between said lower arm portion and said wall means.

2. The apparatus of claim 1 wherein the ratio of the inner diameter of said upper tube section to the inner diameter of said lower tube section is at least about 1.5 to 1.

3. The apparatus of claim 2 wherein a portion of said upper tube section has an inner diameter of about 1.5 inches and wherein a portion of said lower tube section has an inner diameter of about 5/16 inches or less.

4. The apparatus of claim 1 wherein said arm further comprises a shoe mounted to said upper arm portion and disposed between said upper tube section and said upper arm portion for compressing said upper tube section during said dispensing stroke along said predetermined length, said shoe comprising a substantially flat surface for compressing said predetermined length substantially simultaneously.

5. The apparatus of claim 1 further comprising force transmitting means for transmitting a dispensing stroke force to said upper arm portion.

6. The apparatus of claim 5 further comprising means for resiliently biasing said force transmitting means away from the upper arm portion.

7. The apparatus of claim 5 further comprising dispensing stroke adjustment means for adjusting the length of said dispensing stroke.

8. The apparatus of claim 1 further comprising a check valve within said tubing for restricting flow of the viscous fluid in an upward direction during said dispensing stroke.

9. The apparatus of claim 1 wherein said tubing is inclined at an angle of about 15 degrees from vertical.

10. The apparatus of claim 1 further comprising means for selectively permitting said arm to be moved away from said tubing to facilitate removal and replacement of said tubing.

11. A viscous fluid dispensing apparatus comprising:

(a) a length of resilient elastic tubing having an upstream section and a downstream section, wherein the ratio of the inner diameter of said upstream section to the inner diameter of the said downstream section is at least about 1.5 to 1;

(b) wall means for providing a wall adjacent said upstream and downstream sections; and (c) pivotable arm means for selectively compressing said upstream section of said tubing against said wall means to force the viscous fluid downstream in a dispensing stroke, said pivotable arm means including a downstream arm portion for maintaining said downstream section in a closed position when said pivotable arm means is not compressing said upstream section.

12. The apparatus of claim 11 wherein a portion of said upstream section has a diameter of about 1.5 inches and wherein a portion of said downstream section has a diameter of about 5/16 inches.

13. The apparatus of claim 11 further comprising a check valve within said tubing upstream of said upstream section to prevent fluid flow upstream.

14. The apparatus of claim 13 wherein the check valve comprises a flap hinged to a side of said tubing and movable between a first, open position and a second, closed position.

15. The apparatus of claim 11 further comprising:

(a) a cabinet for mounting said tubing, said wall means and said pivotable arm means, with a portion of said downstream section mounted to extend out of the bottom of said cabinet and inclined at an angle from vertical to provide access to the lower end of said downstream section; and (b) a reservoir mounted to the cabinet for containing viscous fluid and connected to said upstream section of said tubing.

16. The apparatus of claim 11 further comprising means for selectively permitting said arm to be moved away from said wall means to facilitate replacement of said tubing.

* * * * *